US 9,460,529 B2

(12) United States Patent
Brandao

(10) Patent No.: US 9,460,529 B2
(45) Date of Patent: Oct. 4, 2016

(54) TOOL AND METHOD FOR EMULATING FLAT-TIP BRUSH

(71) Applicant: Joao Aranda Brandao, Lisbon (PT)

(72) Inventor: Joao Aranda Brandao, Lisbon (PT)

(73) Assignee: Joao Aranda Brandao, Lisbon (PT)

( * ) Notice: Subject to any disclaimer, the term of this patent is extended or adjusted under 35 U.S.C. 154(b) by 28 days.

(21) Appl. No.: 14/145,001

(22) Filed: Dec. 31, 2013

(65) Prior Publication Data

US 2014/0184546 A1 Jul. 3, 2014

Related U.S. Application Data

(60) Provisional application No. 61/747,657, filed on Dec. 31, 2012.

(51) Int. Cl.
*G06F 3/041* (2006.01)
*G06T 11/00* (2006.01)
*G06T 11/20* (2006.01)

(52) U.S. Cl.
CPC ............ *G06T 11/001* (2013.01); *G06T 11/203* (2013.01)

(58) Field of Classification Search
CPC ...... G06F 3/017; G06F 3/041; G06F 17/214; G09G 5/24; G09G 5/28; G06T 11/001; G06T 11/203
See application file for complete search history.

(56) References Cited

U.S. PATENT DOCUMENTS

| | | | | |
|---|---|---|---|---|
| 5,155,813 A * | 10/1992 | Donoghue et al. | ........... | 345/179 |
| 6,501,475 B1 * | 12/2002 | Cheng | ........... | 345/467 |
| 7,511,703 B2 * | 3/2009 | Wilson et al. | ........... | 345/175 |
| 7,743,348 B2 * | 6/2010 | Robbins et al. | ........... | 715/863 |
| 8,830,242 B2 * | 9/2014 | DiVerdi et al. | ........... | 345/473 |
| 2002/0036618 A1 * | 3/2002 | Wakai | ........... | G06F 3/017 345/157 |
| 2005/0057524 A1 * | 3/2005 | Hill | ........... | G06F 3/0421 345/173 |
| 2006/0010400 A1 * | 1/2006 | Dehlin | ........... | G06F 3/0354 715/856 |
| 2009/0193366 A1 * | 7/2009 | Davidson | ........... | 715/863 |
| 2010/0156804 A1 * | 6/2010 | Young | ........... | G06F 3/0416 345/173 |
| 2011/0148796 A1 * | 6/2011 | Hollemans | ........... | G06F 3/044 345/173 |
| 2011/0157032 A1 * | 6/2011 | Mao et al. | ........... | 345/173 |
| 2012/0293427 A1 * | 11/2012 | Mukai et al. | ........... | 345/173 |
| 2013/0016126 A1 * | 1/2013 | Wang et al. | ........... | 345/650 |
| 2013/0050111 A1 * | 2/2013 | Shibata et al. | ........... | 345/173 |
| 2013/0328804 A1 * | 12/2013 | Oshima et al. | ........... | 345/173 |

* cited by examiner

Primary Examiner — Joe H Cheng
(74) Attorney, Agent, or Firm — Saul Ewing LLP

(57) ABSTRACT

A method of emulating a flat tip brush, said method comprising (a) at a given time, identifying first and second points of contact on a touch sensitive surface; (b) interpolating a line between the first and second points, the line having line data comprising at least a length and an angle relative to the screen; (c) recording the first and second points and the line data; (d) reiterating steps (a)-(c) for at least one subsequent time to determine a plurality of the first points and a plurality of the second points and a plurality of the lines; and (e) displaying on a display screen an image defined by the first points, by the second points and/or by the lines between the first and second points.

16 Claims, 7 Drawing Sheets a) Identifying a first and second point of contact on a touch-sensitive surface;

↓ b) Interpolating a line between first and second points, the line having line data comprising at least a length and an angle relative to touch-sensitive surface;

↓ c) Recording first and second points and line data;

↓ d) Repeating steps A-C to determine plurality of first points and plurality of second points and plurality of lines;

↓ e) Displaying on a display screen an image defined by first points, second points and/or lines between first and second points.

Fig. 11
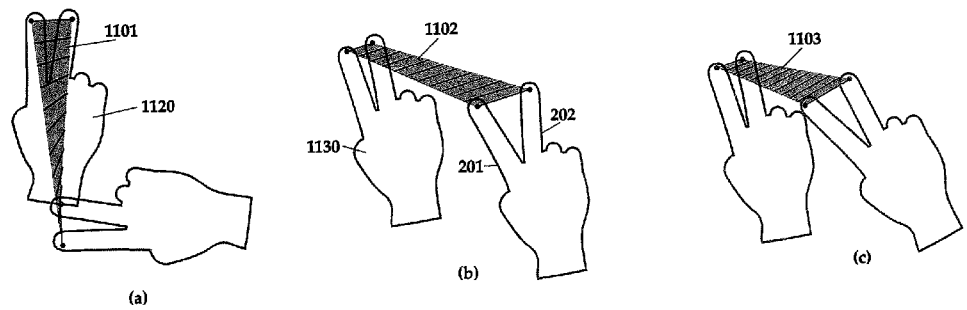
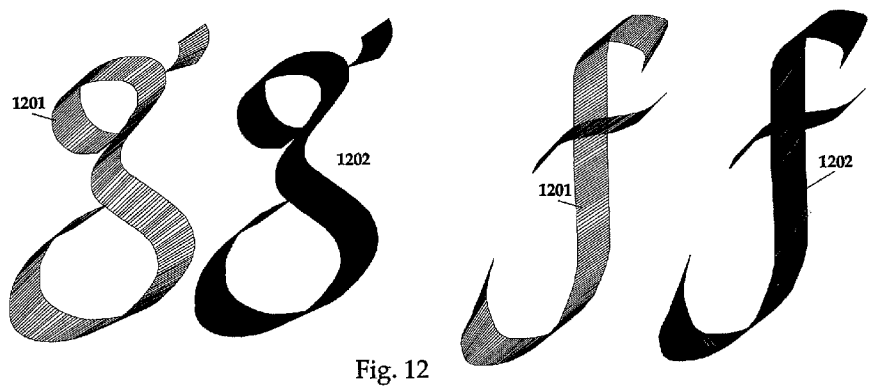
Fig. 12
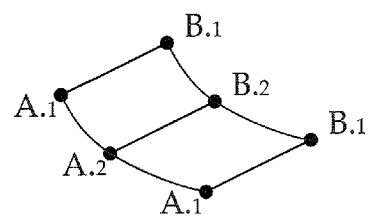
Fig. 13
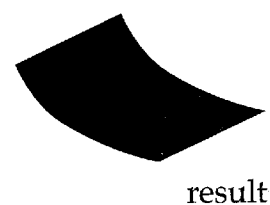
Fig. 14 a) Identifying a first and second point of contact on a touch-sensitive surface;

b) Interpolating a line between first and second points, the line having line data comprising at least a length and an angle relative to touch-sensitive surface;

c) Recording first and second points and line data;

d) Repeating steps A-C to determine plurality of first points and plurality of second points and plurality of lines;

e) Displaying on a display screen an image defined by first points, second points and/or lines between first and second points.

FIG. 17

TOOL AND METHOD FOR EMULATING FLAT-TIP BRUSH

REFERENCE TO RELATED APPLICATIONS

This application claims priority to Provisional Application No. 61/747,657, filed Dec. 31, 2012, incorporated herein by reference in its entirety.

REFERENCE TO APPENDIX

The following Appendices are attached and hereby incorporated into the application:
 Appendix 1: Foundational Hand
 Appendix 2: Capitals
 Appendix 3: Italic Hand
 Appendix 4: Textura Quadrata
 Appendix 5: Fraktur
 Appendix 6: Gothic Capitals
 Appendix 7: Numbers and Punctuation

BACKGROUND

Western calligraphy developed initially from ancient roman times until the invention of the printing press by Guthenberg. During that time, scribes copied by hand books and documents using pens or quills with a flat tip. Because of the flat tip, as they wrote, the characters would naturally assume thin and thick areas. Although the advent of the printing press and typography temporary deemphasized calligraphy, Edward Johnston (1872-1944) rediscovered calligraphy and published a book which has had a profound effect on font design principals of the 20th and 21th century.

Nowadays serious font designers have knowledge of calligraphy that gives them an understanding of the basis of font anatomy, and the reasons for its contrasts and structure. Accordingly, new fonts are being developed with refined contrasts in thickness that strongly enhance their legibility and personality in both serif and sans serif fonts.

Although one can read about calligraphy, there is little practical leaning without the experience of properly handling the calligraphic flat brush or flat tip pen and learning to feel the characters unravel in different ways. Calligraphy must be practiced to develop a deeper understanding and facilitate creative freedom for font design.

Today's design and illustration software often contain tools that function as calligraphic brushes. These typically work by defining a fixed width and angle of a virtual brush. This way, it is possible to draw calligraphy and edit the shape. However, these tools do not allow the liberty of a real flat brush or flat tip pen. With a flat paintbrush, one can start to draw a character with one inclination and finish with a different one. Additionally, with a real brush, it is possible to press harder or lighter to achieve a different thickness along the same stroke. Furthermore, one can lift and turn the paintbrush to finish off serifs. All this can be done in a natural instinctive way that works as an extension of the hand, focused only on the result.

Applicants recognize that this liberty in controlling the flat brush is key. Not only does it allow mistakes that are very important to the educational process, but also it enables experts to finish their finest details. That is, expert calligraphers tend to create better calligraphy and do it substantially faster when done by hand. Adjusting thickness and angle between each stroke in a computer is extremely time consuming, and the inability to rotate the brush as one is drawing is a major shortcoming. Therefore, the existing software is inadequate for the educational process and inefficient for the expert. Thus, there is a need for a software-based system that emulates the functionality of a flat brush. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a tool that solves the aforementioned problems and liberates the user by providing flat brush control to the user's hand. The tool does this by exploiting existing multi-gesture software of tablet computers and software for allowing the use of multiple fingers (or implements having two points of contact) to define two points of contact. The simple placement and subsequent drag of those points across the screen feeds coordinates for the system to plot/draw an image of what looks like the swath of a brush. The distance between points will determine the thickness of the stroke, and their relative position will determine the inclination or angle. As the fingers or implement is dragged over the screen, a shape is formed. Because it works without the need to set line thickness and angle parameters ahead of time and because the user can change the relative position of the points as he draws, the user is painting with all the liberty and instructiveness of a real brush. Furthermore, because the tool allows for both change in rotation and change in thickness simultaneously, and all of this can be done during the drawing gesture just like it was done during the brush stroke, the user will easily adjust to a real paint brush or calligraphic pen as he will understand the underlying principals. Conversely, the expert scribe will easily adjust to this tool.

Because this tool is developed on a digital platform, significant enhancements to freehand are within the scope of the invention, including, for example, the ability to undo; the ability to redo just one character in a word; the ability to email the document as vector drawing for further editing and fine tuning with professional software; the ability to trace over a base instructional font especially developed for the purpose; the ability to turn on and of guides for the baseline, x-height, ascenders and descenders; the ability to scale and print in any size; the ability to easily share and copy; and the ability to learn alone. Additionally, the software allows the user to perform calligraphy virtually anywhere, without the need to carry special pens, inks, and paintbrushes. The system may also be connected to a projector for teaching and demonstrating how to draw a specific character.

In addition to the tool, fonts have been specifically designed for this application. These fonts were all developed considering the scale of the typical tablet computer and its relation with the fingers as they are used with the developed "tool". Other than their "normal version", the fonts are also created as a tracing image to teach the calligraphic gesture. Specifically, instead of being a full shape, they are deigned as two lines, one for each finger, with indication of where to begin the gesture, and where to end. The users will place their fingers on each starting point, and by following the lines they will be able to draw the character correctly on their own, without the help of an instructor. The following fonts as set forth in Appendix are part of this invention:

Appendix 1: a foundation hand font, based on Carolinge calligraphy that is the base of roman type; Appendix 2: a capitals font; Appendix 3: an italic font, Appendix 4: textura quadrata font, Appendix 5: a fraktur font, Appendix 6: a gothic capitals font, and Appendix 7: a numbers and punctuation font.

Accordingly, one aspect of the invention is a method of recording the position and movement of a two points (e.g. made using the user's fingers) to emulate a flat tip paint brush. In one embodiment, the method comprises: (a) at a given time, identifying first and second points of contact on a touch-sensitive surface; (b) interpolating a line between said first and second points, said line having line data comprising at least a length and an angle relative to said screen; (c) recording said first and second points and said line data; (d) reiterating steps (a)-(c) for at least one subsequent time to determine a plurality of said first points and a plurality of said second points and a plurality of said lines; and (e) displaying on a display screen an image defined by said first points, by said second points and by said lines between said first and second points.

Another aspect of the invention is a tool or system for emulating a brush by position and movement of a two points (e.g., made by a user's fingers). In one embodiment, the tool comprises a digital processor, memory operatively connected to said processor and a touch sensitive surface and a display screen operatively connected to said processor, said memory being configured with instructions for instructing said processor to execute the following steps: (a) at a given time, identifying a first and second points of contact on said touch sensitive surface; (b) interpolating a line between said first and second points, said line having line data comprising at least a length and an angle relative to said display; (c) recording said first and second points and said line data; (d) reiterating steps (a)-(c) for at least one subsequent time to determine a plurality of said first points and a plurality of said second points and a plurality of said lines; and (e) displaying on said display screen an image defined by said first points, by said second points and by said lines between said first and second points.

Yet another aspect of the invention is software for emulating a paint brush by position and movement of a user's fingers. In one embodiment, the software comprises a computer readable medium comprising instructions for instructing a processor operative connected to a touch sensitive surface and a display screen to execute the following steps: (a) at a given time, identifying first and second points of contact on said touch sensitive surface; (b) interpolating a line between said first and second points, said line having line data comprising at least a length and an angle relative to said display screen; (c) recording said first and second points and said line data; (d) reiterating steps (a)-(c) for at least one subsequent time to determine a plurality of said first points and a plurality of said second points and a plurality of said lines; and (e) displaying on said display screen an image defined by connecting said first points, by said second points and by said lines between said first and second points.

Still another aspect of the invention is a tool for providing instructions and how to perform calligraphy.

Still another aspect of the invention are fonts for use on the above-mentioned tool. The fonts are shown in Appendices 1-7 attached.

BRIEF DESCRIPTION OF DRAWINGS

FIG. 11(*a*)-(*c*) shows the different shape swaths achieved by rotating the hand, by moving the fingers and both by rotating the hand and moving the fingers.

FIG. 12 shows different calligraphy letters.

FIG. 13 illustrates the points generated in software

FIG. 14 shows the result of FIG. 13.

FIG. 17 showing a method of emulating a flat tip brush.

DETAILED DESCRIPTION

The following detail description focuses on Calligraphy for illustrative purposes. It should be appreciated, however, that the invention is not limited to Calligraphy and may be practiced in any application in which a paint brush or similar implement is used.

Figure 1:
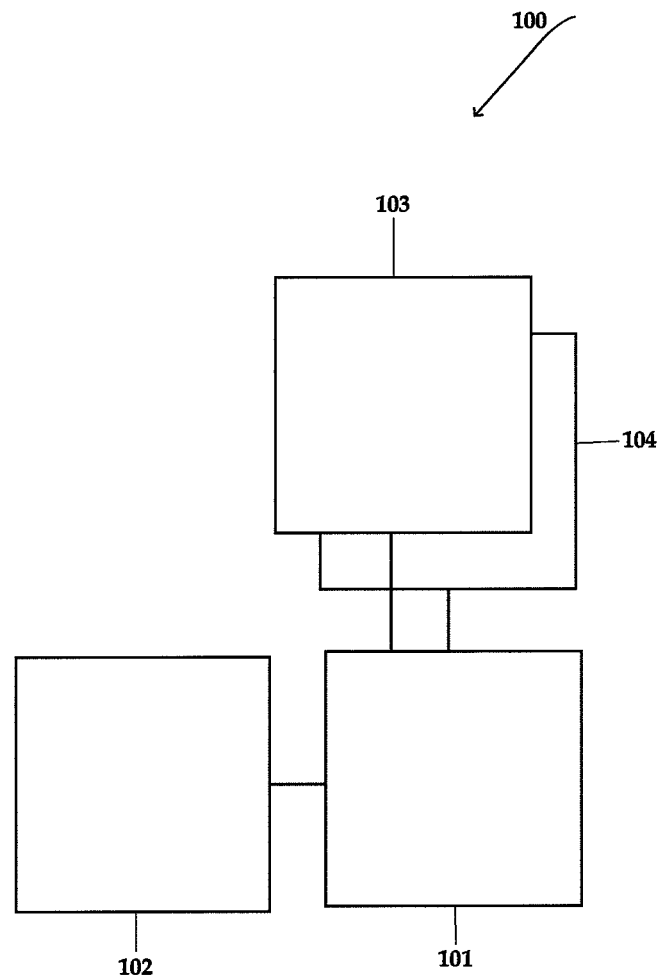
FIG. 1 shows a schematic of one embodiment of the system of the present invention.

The present invention relates to an electronic brush system and method for emulating a brush's swath on a display. Referring to FIG. 1, a schematic of the system 100 is shown. The system comprises a digital processor 101, memory 102 operatively connected to said processor, a display screen 103 and touch-sensitive surface 104 operatively connected to said processor through known circuitry/drivers. Suitable systems include, for example, tablet computers such as the IPAD® and other similar tablets, as well as desktop or laptop computers having touch-sensitive screens which are integrated with the systems or added as discrete units. In one embodiments, the touch-sensitive surface is integrated into the display screen as is well known. It should be understood, however, that the display screen and touch sensitive surface may be discrete. For example, the touch-sensitive surface may be a mouse pad or similar device, which communicates with processor and the display. Still other systems are possible and will be obvious to those of skill in the art in light of this disclosure.

The memory 102 is configured with instructions for instructing said processor to execute steps to emulate the swath of a brush. In one embodiment shown in FIG. 17, the process comprises the following steps: (a) at a given time, identifying first and second points of contact on said touch sensitive surface; (b) interpolating a line between said first and second points, said line having line data comprising at least a length and an angle relative to said screen; (c) recording said first and second points and said line data; (d) reiterating steps (a)-(c) for at least one subsequent time to determine a plurality of said first points and a plurality of said second points and a plurality of said lines; and (e) displaying on said display screen an image defined by said first points, by said second points and by said lines between said first and second points. These steps are described in greater detail below.

The system and method of the present invention is particularly well suited for learning, practicing and creating calligraphy, although the invention is not limited to calligraphy, and can be used in any application involving a brush in which the pitch/angle of the brush and/or its thickness are variables. In this respect, the tool emulates the behavior of a real flat brush, flat nib pen or other flat tip writing instrument.

As mentioned above, the system receives two points on the touch-sensitive surface, which can be generated in different ways. For example, in one embodiment, the user uses his fingers to generate the two input points. Alternatively, the points may be inputted by a double-tipped stylus or other tool in which at least two physical contact points are made with the touch-sensitive surface. If an implement other than the user's fingers is used to generate the two points, in one embodiment, the implement is sensitive to pressure such that when increased pressure is applied, the two points separate. For example, in one embodiment, the implement is a two-prong stylus in which the prongs are compliant such that, when the implement is pressed against the touch sensitive surface, the prongs splay and thereby increase the distance between the points.

For illustrative pursues in this disclosure, the points are generated using two fingers.

Figure 2:
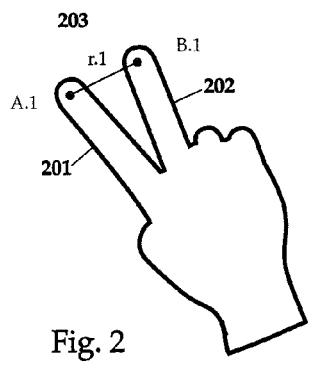
FIG. 2 illustrates one embodiment of the invention in which the user's hand defines the first and second points.

As shown in FIG. 2, the placement of two fingers 201, 202 on the screen 203 creates coordinates that define two points A.1 & B.1. By uniting the points A.1 to B.1, a strait line is plotted, r.1. This line has a particular length and angle and defines the starting element of the virtual brush.

Figure 3:
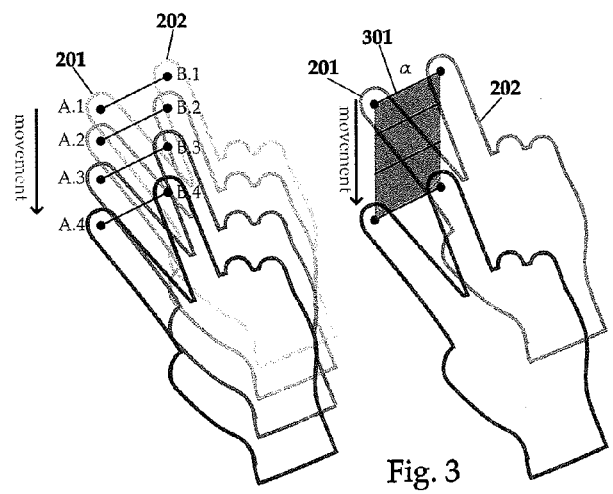
FIG. 3 shows the formation of a swath from the movement of the hand in FIG. 2.

As shown in FIG. 3, dragging the fingers 201, 202 causes the initial coordinates to change and the line moves—i.e., the initial line changes in distance and angle α as the relation between the two points is modified. Therefore, as the line drags like a flat paintbrush, it virtually "paints" its path or swath 301 as a full shape. This creates a unique dynamic virtual brush.

Figure 4:
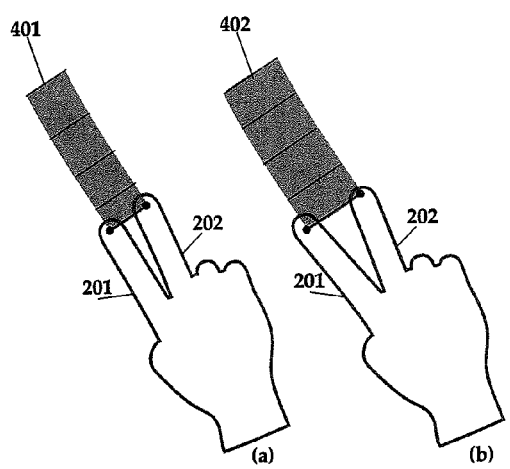
FIGS. 4(*a*)&(*b*) and 5(*a*)&(*b*) show the different shaped swaths formed by moving the hand and fingers.
Figure 5:
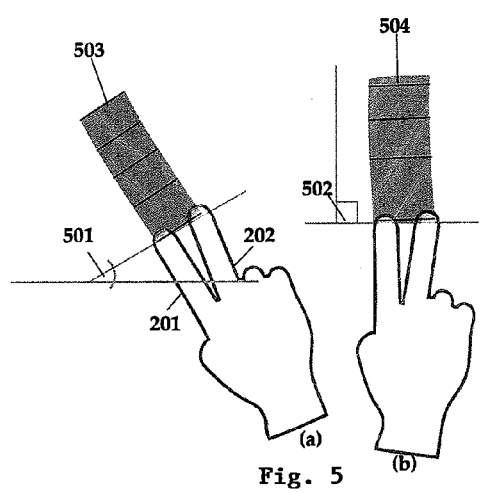
Figure 6:
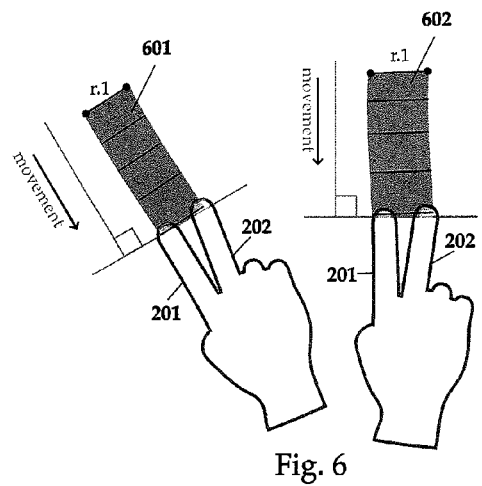
FIGS. 6-8 show the difference in swath thickness just by moving and rotating the hand.

One can control the swath of the virtual brush in different ways. For example, referring to FIGS. 4(a) and 4(b) by increasing the distance between the fingers 201, 202, the width of the swath 401 and 402 is increased. Additionally, by positioning the fingers 201, 202 to set the angle 501, 502 as shown in FIGS. 5(a) and 5(b), the width of the swath 503, 504 can be controlled. These variables change dynamically with the movement of the fingers, enabling the angle or thickness of the swath to change during the stroke.

Figure 7:
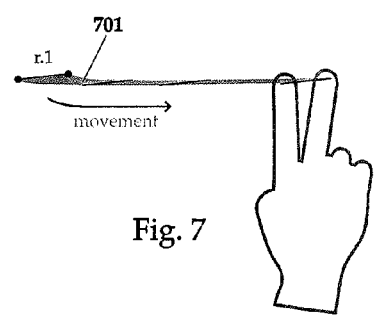
Figure 8:
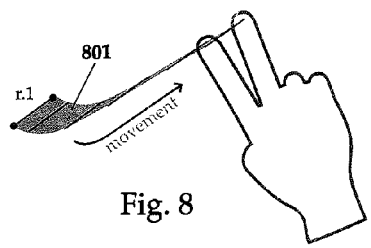
Figure 9:
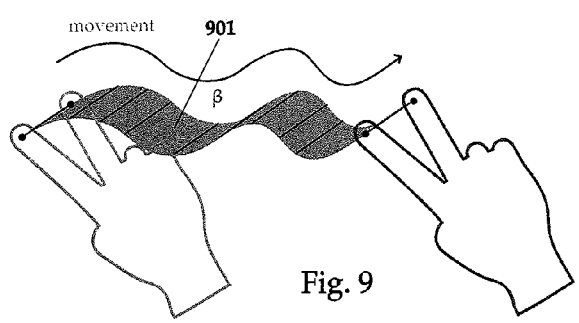
FIG. 9 shows the wavy swath shape formed by wiggling the hand as it moves.
Figure 10:
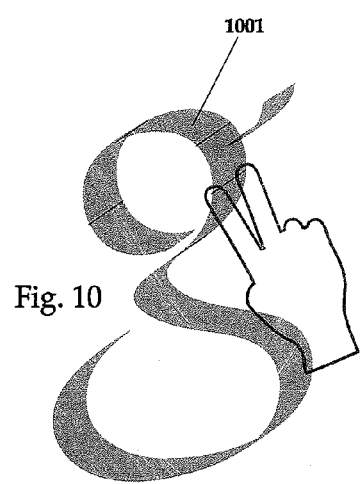
FIG. 10 shows how changing line thickness can be used in calligraphy.

Referring to FIGS. 6-10, the versatility of the virtual brush is demonstrated. For example, in FIG. 6, when one paints perpendicularly to the line r.1, the swath 601, 602 will be relatively thick. However, when one paints parallel to the line r.1 the swath 701 will be relatively thin as shown in FIG. 7. If the movement is curved and wiggly, a curved swath 801, 901 is drawn with varying thickness as shown in FIGS. 8 and 9, respectively. Referring to FIG. 10, the versatility of the system is shown in creating the letter "g" which has a swath 1001 of varying thickness.

Referring to FIGS. 11(a)-(c), different swath 1101, 1102 and 1103 are created by changing the motion of the hand and positioning of the fingers during the stroke. Specifically, in FIG. 11(a), the finger distance is kept the same, but the hand 1120 is moved downward and turned about 90 degrees. This creates a pointed swath 1101 as shown. In FIG. 11(b), the angle of the hand 1130 is kept about the same but the distance between the fingers 201, 202 is increased, creating a wedge-shaped swath 1102. In FIG. 11(c), during the movement of the hand 1140, the hand is rotated such that the line between the fingers becomes perpendicular to the movement of the hand. Additionally, the distance between the fingers 201 and 202 is increased. This motion creates a wedge-shape swath 1103 which is wider than that of FIG. 11(b).

From these figures, it should be clear that the virtual brush of the present invention has the ability to easily change the angle or thickness of the swath during the stroke, thus adding realism to the tool. In particular, one can change (1) the angle of the brush by turning the fingers as the shape is being created; (2) the thickness of the brush by moving the fingers apart as the shape is being created; and (3) angle and thickness of the brush simultaneously as the shape is being created. Such control facilitates calligraphy as shown in FIG. 12. The image of the letters to the left shows the discrete lines 1201 created between the two points defined by fingers are moved, while the image to the right shows the swath 1202 in solid/filled in.

Figure 15:
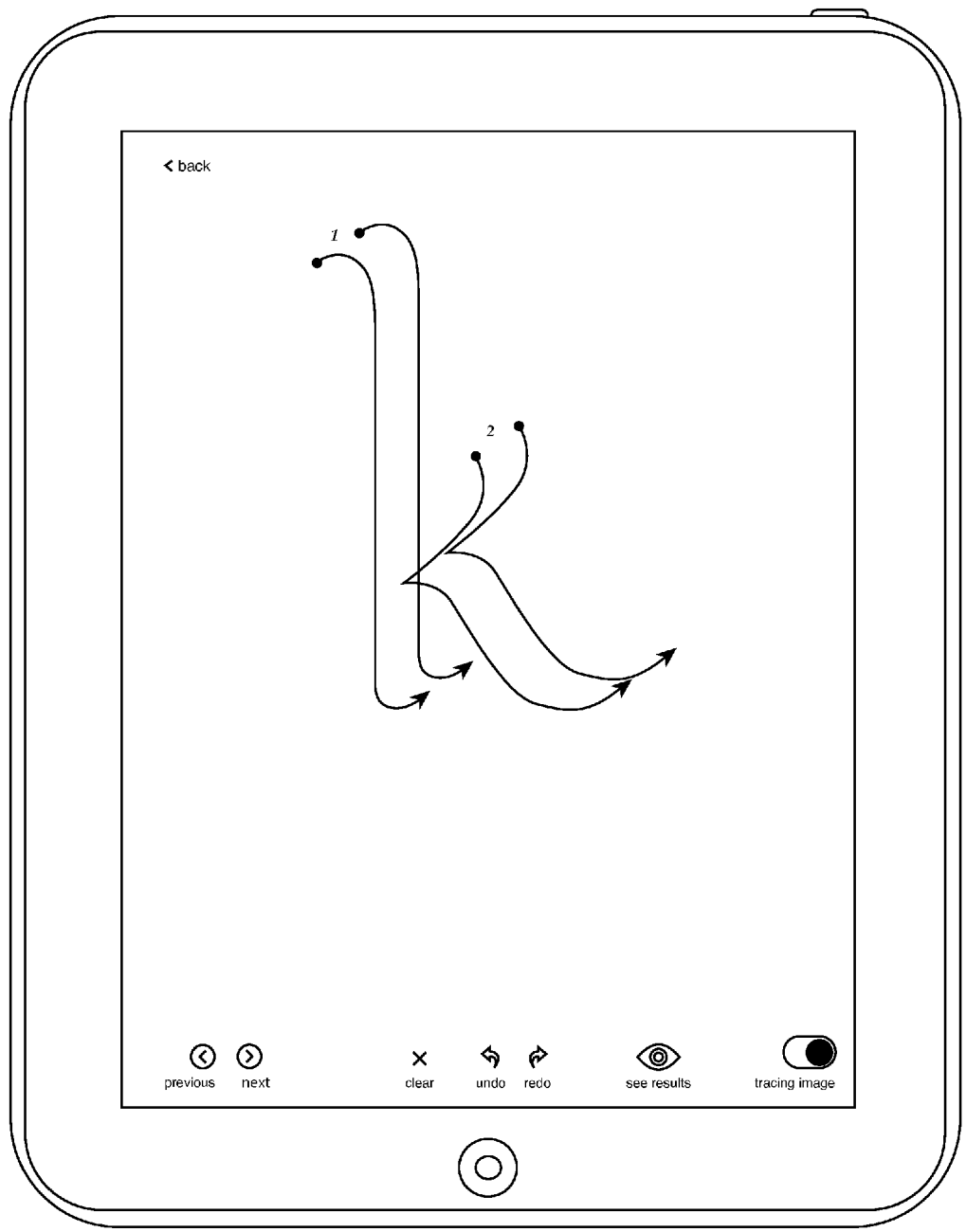
FIG. 15 shows a display of a character and indicates finger position of each of the first and second finger.
Figure 16:
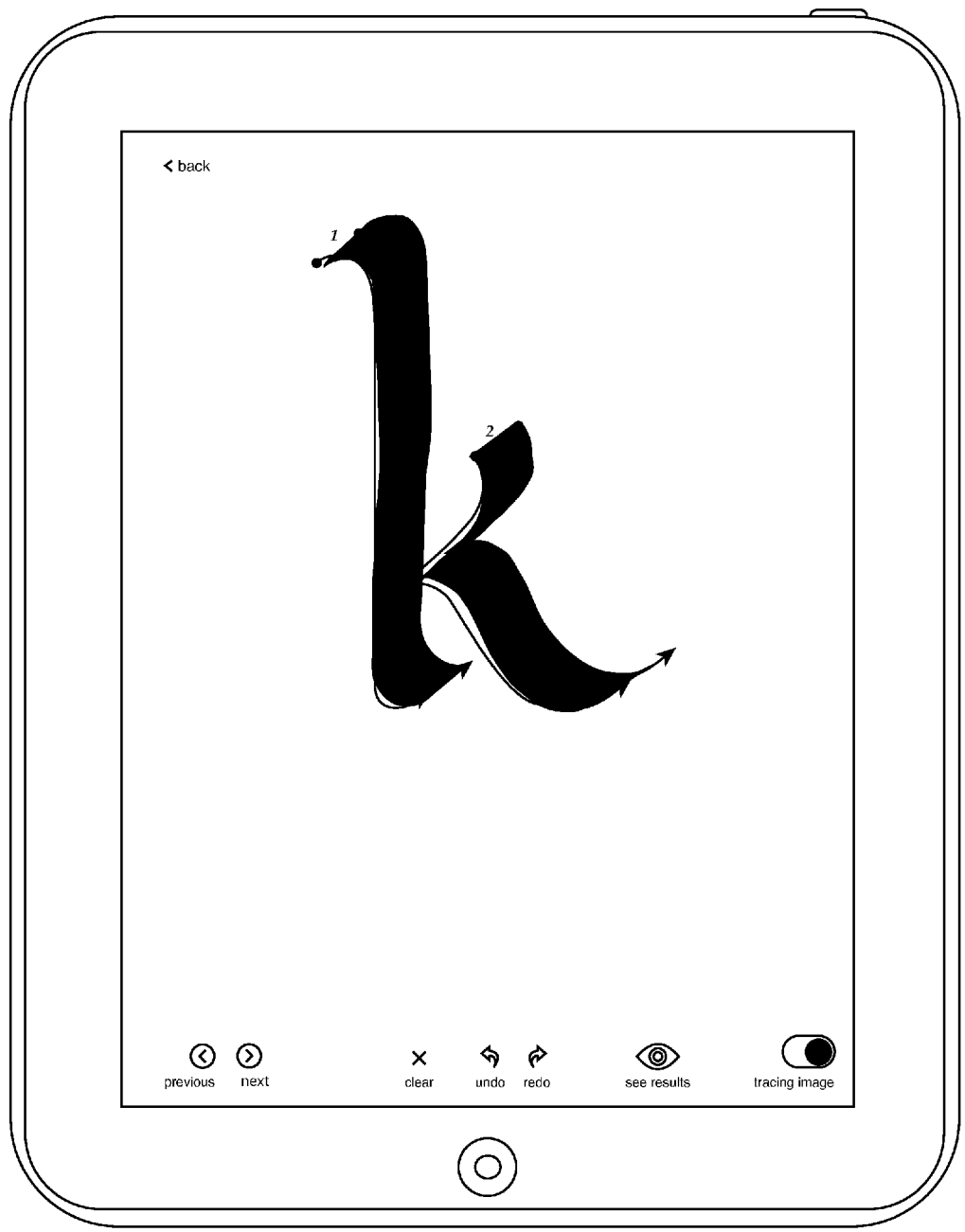
FIG. 16 shows a display of the user's attempt at drawing the character.

Still another aspect of the invention is a tool for providing instructions and how to perform calligraphy. One embodiment of said instructions are attached hereto as Appendix 8. For example, in one embodiment, the tool displays a character and indicates finger position of each of the first and second finger (see, e.g. FIG. 15) and displays the user's attempt at drawing the character (see, e.g., FIG. 16). In one embodiment, in which the touch sensitive surface and the display screen are integrated, the display screen can be used to backlight paper that is placed over the display screen and allow the user to use a real brush to traces the displayed characters revealed through the paper.

In addition to the tool, fonts have been specifically designed for this application. These fonts were all developed considering the scale of the typical tablet computer and its relation with the fingers as they are used with the developed "tool". Other than their "normal version", the fonts are also created as a tracing image to teach the calligraphic gesture. Specifically, instead of being a full shape, they are deigned as two lines, one for each finger, with indication of where to begin the gesture, and where to end. The users will place their fingers on each starting point, and by following the lines they will be able to draw the character correctly on their own, without the help of an instructor. The following fonts as set forth in Appendix are part of this invention: Appendix 1: a foundation hand font, based on Carolinge calligraphy that is the base of roman type; Appendix 2: a capitals font; Appendix 3: an italic font, Appendix 4: textura quadrata font, Appendix 5: a fraktur font, Appendix 6: a gothic capitals font, Appendix 7: a numbers and punctuation font, and Appendix 8: a tutorial.

Any known or later developed programming language may be used to practice the present invention. In this illustration, the system was created using x-code in objective C for the tablet, IPAD®. The following is an explanation of selected code:

To generate a brush with a line, this example uses three sets of two touch points as shown in FIG. 13.
The function midPoint returns the middle point between two points. drawCurvedFigureWithPrevious draws a geometric figure of two bezier curves and a straight lines that corresponds to a segment.

BEZIER_PERCENTAGE is a constant for tweaking the smoothness of the curves.

```
- (void)drawCurvedFigureWithPrevious:(TouchPoints *)previous current:(TouchPoints
    *)current next:(TouchPoints *)next inContext:(CGContextRef)context {
    Point mid1 = midPoint(previous.start, current.start);
    Point mid2 = midPoint(current.start, next.start);
    Point mid3 = midPoint(current.end, next.end);
    Point mid4 = midPoint(previous.end, current.end);
    ContextBeginPath(context);
    ContextMoveToPoint(context, mid1.x, mid1.y);
    Point cpx1 = pointWithPercentage(BEZIER_PERCENTAGE, mid1, current.start);
    Point cpx2 = pointWithPercentage(BEZIER_PERCENTAGE, mid2, current.start );
    ContextAddCurveToPoint(context, cpx1.x, cpx1.y, cpx2.x, cpx2.y, mid2.x, mid2.y);
    ContextAddLineToPoint(context, mid3.x, mid3.y);
    Point cpx3 = pointWithPercentage(BEZIER_PERCENTAGE, mid3, current.end);
    Point cpx4 = pointWithPercentage(BEZIER_PERCENTAGE, mid4, current.end);
    ContextAddCurveToPoint(context, cpx3.x, cpx3.y, cpx4.x, cpx4.y, mid4.x, mid4.y);
}
```

To draw each of the segments between the point, the routine is called every time the view is drawn. It iterates over all the touch points recorded and calls drawCurvedFigureWithPrevious:current:next:inContext:.

```
- (void)drawView
{
    ContextRef context = UIGraphicsGetCurrentContext( );
    for ( Array *p in _paths)
    {
        //Enumerator for all the sets of 2 touches.
        Enumerator *touchesEnumerator = [p objectEnumerator];
        //TouchPoints is a class that stores two points representing the two
            finger touches.
        TouchPoints *next;
        TouchPoints *current = [linesEnumerator nextObject];
        TouchPoints *previous = current;
        while (next = [linesEnumerator nextObject]) {
            [self drawCurvedFigureWithPrevious:previous current:current
next:next inContext:context];
            previous = current;
            current = next;
            ContextClosePath(context);
            ContextDrawPath(context, Fill);
        }
    }
}
```

To smooth the swath, the drawn points are not necessarily equal to the touch points and a scaling is applied given by a percentage number.

```
Point pointWithPercentage(Float percentage,Point p1, Point p2)
{
    return PointMake(p1.x + (p1.x − p2.x) * percentage, p1.y +
        (p1.y − p2.y) * percentage);
}
```

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A method of emulating a flat tip brush, said method comprising:
   (a) at a given time, identifying first and second points of contact on a touch-sensitive surface;
   (b) interpolating a line between said first and second points, said line having line data comprising at least a length and an angle relative to said touch-sensitive surface;
   (c) recording said first and second points and said line data;
   (d) reiterating steps (a)-(c) for at least one subsequent time to determine a plurality of said first points and a plurality of said second points and a plurality of said lines; and
   (e) displaying on a display screen an image defined by said first points, by said second points and/or by said lines between said first and second points.

2. The method of claim 1, wherein said first point is made with a first finger and said second point is made with a second finger.

3. The method of claim 2, further comprising prior to step (a) displaying on said touch-sensitive surface a first and second suggested points for contacting said first and second fingers and at least one arrow indicating a suggested path to move said first and second fingers.

4. The method of claim 3, wherein said suggested path defines an alphanumeric.

5. The method of claim 4, wherein said alphanumeric is calligraphic.

6. The method of claim 1, wherein said image is the space including said lines.

7. The method of claim 1, further comprising prior to step (a), prompting a user to input a desired message to be displayed, recording said desired message, and displaying at least part of said desired message for said user to emulate.

8. The method of claim 1, wherein said touch-sensitive surface is connected to a digital processor and said digital processor is connected to memory.

9. The method of claim 8, wherein said display screen and said touch-sensitive surface are integrated.

10. The method of claim 9, wherein said touch-sensitive surface, display screen, processor and memory being integrated into a single device.

11. The method of claim 10, wherein said device is a tablet.

12. The method of claim 11, wherein said tablet is an IPAD®.

13. A non-transitory computer-readable medium comprising non-transitory instructions for instructing a processor operative connected to a touch-sensitive surface to execute the following steps:
   (a) at a given time, identifying first and second points of contact on said touch-sensitive surface;

(b) interpolating a line between said first and second points, said line having line data comprising at least a length and an angle relative to said touch-sensitive surface;

(c) recording said first and second points and said line data;

(d) reiterating steps (a)-(c) for at least one subsequent time to determine a plurality of said first points and a plurality of said second points and a plurality of said lines; and (e) displaying on a display screen an image defined by said first points, by said second points and/or by said lines between said first and second points.

14. A device comprising a digital processor, memory operatively connected to said processor and a touch-sensitive surface operatively connected to said processor, said memory being configured with instructions for instructing said processor to execute the following steps:

(a) at a given time, identifying a first point of contact made with a first finger and a second point of contact made with a second finger;

(b) interpolating a line between said first and second points, said line having line data comprising at least a length and an angle relative to said touch-sensitive surface;

(c) recording said first and second points and said line data;

(d) reiterating steps (a)-(c) for at least one subsequent time to determine a plurality of said first points and a plurality of said second points and a plurality of said lines; and (e) displaying on said touch-sensitive surface an image defined by said first points, by said second points and/or by said lines between said first and second points.

15. The device of claim 14, wherein said device is a tablet.

16. The device of claim 15, wherein said tablet is an IPAD®.

* * * * *